US008675056B2

(12) United States Patent
Ishida

(10) Patent No.: US 8,675,056 B2
(45) Date of Patent: Mar. 18, 2014

(54) STEREOGRAPHIC GLASSES

(75) Inventor: Akihito Ishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 13/180,652

(22) Filed: Jul. 12, 2011

(65) Prior Publication Data

US 2012/0044332 A1   Feb. 23, 2012

(30) Foreign Application Priority Data

Aug. 20, 2010   (JP) ................................. 2010-185172

(51) Int. Cl.
*H04N 13/04* (2006.01)

(52) U.S. Cl.
USPC ................... 348/56; 348/43; 348/51; 348/53; 348/54; 348/55; 348/521; 348/524; 348/525; 348/526; 345/419

(58) Field of Classification Search
USPC ............. 348/54, 55, 56, 43, 51, 53, 521, 524, 348/525, 526; 345/419
See application file for complete search history.

(56) References Cited

U.S. PATENT DOCUMENTS

| | | | | |
|---|---|---|---|---|
| 6,791,599 | B1 * | 9/2004 | Okada et al. ..................... | 348/56 |
| 2010/0165085 | A1 * | 7/2010 | MacNaughton et al. ....... | 348/56 |
| 2010/0194857 | A1 * | 8/2010 | Mentz et al. ..................... | 348/43 |
| 2010/0259603 | A1 * | 10/2010 | Mihara et al. ................... | 348/53 |
| 2010/0295929 | A1 * | 11/2010 | Yoshifuji et al. ................. | 348/53 |

FOREIGN PATENT DOCUMENTS

| | | |
|---|---|---|
| JP | 2-092187 A | 3/1990 |
| JP | 08-265863 A | 10/1996 |
| JP | 8-278468 A | 10/1996 |
| JP | 8-317423 A | 11/1996 |
| JP | 11-55136 A | 2/1999 |
| JP | 11-98538 A | 4/1999 |
| JP | 2001-75045 A | 3/2001 |
| JP | 2007-86851 A | 4/2007 |
| JP | 2010-62767 A | 3/2010 |
| KR | 2010-0127179 A | 12/2010 |

OTHER PUBLICATIONS

Oura. JP08-317423 JPO Full Text and Abstract Translation. Nov. 1996.*
Oi et al. JP2010-062767 JPO Full Text and Abstract Translation. Mar. 2010.*

* cited by examiner

*Primary Examiner* — Christopher S Kelley
*Assistant Examiner* — Zhihan Zhou
(74) *Attorney, Agent, or Firm* — Birch, Stewart, Kolasch & Birch, LLP

(57) ABSTRACT

Stereographic glasses includes reception-stop timing control means that is so arranged as to: (i) cause a wireless-signal receiving section to stop receiving signals, after a cycle detection section detects a cycle of synchronous signals and a liquid crystal shutter control data memory section stores liquid crystal shutter control data therein signals; (ii) cause a liquid crystal shutter control signal timing generation section to generate timings for controlling opening and closing of liquid crystal shutters, based on cycle signals generated by a cycle signal generation section and the liquid crystal shutter control data stored in the liquid crystal shutter control data memory section; and (iii) cause a liquid crystal shutter control section to open and close the liquid crystal shutters, at the timings thus generated.

13 Claims, 8 Drawing Sheets

FIG. 7  PRIOR ART

STEREOGRAPHIC GLASSES

This Nonprovisional application claims priority under 35 U.S.C. §119(a) on Patent Application No. 2010-185172 filed in Japan on Aug. 20, 2010, the entire contents of which are hereby incorporated by reference.

TECHNICAL FIELD

The present invention relates to stereographic glasses (i) which is driven by batteries and (ii) which receives, via wireless communication, switching information for switching between an image for a right eye and an image for a left eye, which are displayed on a display of a TV (Television) or PC (Personal Computer), and then controls opening and closing of respective liquid crystal shutters for a lens for the right eye and a lens for the left eye, thereby allowing a viewer to see a three-dimensional image via the stereographic glasses. Especially, the present invention relates to a technique of reducing electric-power consumption and enhancing resistance to exogenous noise during communication.

BACKGROUND ART

Conventionally, in a case where a three-dimensional image is viewed by use of stereographic glasses using liquid crystal shutter lenses, right-eye images (images for a right eye) and left-eye images (images for a left eye) are alternately displayed on a display of a TV (Television) or PC (Personal Computer). While a right-eye image is being displayed, only a liquid crystal shutter provided for a right lens of the stereographic glasses is opened. In the meantime, while a left-eye image is being displayed, only a liquid crystal shutter provided for a left lens of the stereographic glasses is opened. Such operations are repeatedly performed so that a three-dimensional image is viewable through the stereographic glasses.

That is, as illustrated in FIG. 7, (i) display-refreshing timings of a display (not shown) and (ii) right-eye information and left-eye information of images to be displayed are transmitted from a wireless-signal transmitter 101 of a TV or PC. Subsequently, a wireless-signal receiving section 111 of stereographic glasses 110 receives these pieces of information, and then a liquid crystal shutter control signal timing generation section 112 receives synchronous signals and generates timings for controlling liquid crystal shutters 114 based on the synchronous signals. Then, a liquid crystal shutter control section 113 controls, based on received signals, each of the liquid crystal shutters 114 for a right lens and a left lens so that a right-eye image is observable only by a right eye and a left-eye image is observable only by a left eye, thereby allowing a viewer to see a three-dimensional image.

The following describes this process more specifically, with reference to a timing diagram shown by (a) to (d) of FIG. 8. As illustrated in (a) of FIG. 8, a synchronous signal is transmitted as a wireless signal at a display-refreshing timing of a TV or PC display. When a right-eye image is to be displayed, a "right-shutter-open" signal is transmitted as the wireless signal. When a left-eye image is to be displayed, a "left-shutter-open" signal is transmitted as the wireless signal. On the other hand, as illustrated in (b) to (d) of FIG. 8, the stereographic glasses 110 operates as follows: upon receiving the wireless signal, a left or right lens-control signal is outputted at an optimum timing in sync with a synchronous signal. More specifically, when a "right-shutter open" signal is received, a lens-control signal is outputted so as to open a corresponding one of the liquid crystal shutters 114 for the right lens. In the meantime, when a "left-shutter-open" signal is received, a lens-control signal is outputted so as to open a corresponding one of the liquid crystal shutters 114 for the left lens.

As the wireless signal, an infrared signal or an electrical-wave signal can be used.

In the aforementioned conventional technique, wireless transmission is carried out at the timing when a frame of the TV or PC display is switched to another frame. For example, when a frame frequency is 100 Hz, signals are transmitted at every 10 ms, and the stereographic glasses 110 repeatedly receive the signals at the same timings as the transmission. On this account, as the frame frequency is higher, electric-power consumption of the wireless-signal receiving section 111 tends to be larger. Further, the wireless-signal transmitter 101 is continuously connected to a power supply of the TV. However, the stereographic glasses 110 are driven by batteries. This raises such a problem that the higher the frame frequency is, the shorter the utilization life of the stereographic glasses 110 becomes.

In view of this, Patent Literature 1 discloses a wireless receiving device that is developed to avoid this problem.

In order to solve the problem, the wireless receiving device of Patent Literature 1 includes: a switch for switching between on and off of a power supply circuit of a receiving section; and switch control means. In this arrangement, even within 10 ms, the switch is turned off during an idling period in which no wireless-transmission signal is being transmitted, for example, thereby reducing electric-power consumption. More specifically, (i) a cycle of wireless-transmission signals transmitted from a transmitter side is detected, (ii) an idling period of the wireless-transmission signals is calculated based on the cycle, and (iii) the switch is turned off during the idling period.

On the other hand, there is another problem in relation to the stereographic glasses. That is, data is adversely affected by exogenous noise when the stereographic glasses receive the data, thereby causing a liquid crystal shutter control of the stereographic glasses to malfunction so that a three-dimensional image cannot be viewed normally.

In view of such a problem, a stereographic-glass device is proposed in Patent Literature 2.

In order to solve this problem, the stereographic-glass device of Patent Literature 2 is configured to close a gate so as not to receive any wireless-transmission signal during an idling period of the wireless-transmission signals even within 10 ms, for example, thereby improving noise resistance.

CITATION LIST

Patent Literature

Patent Literature 1
Japanese Patent Application Publication, Tokukaihei, No. 8-265863 A (Publication Date: Oct. 11, 1996)
Patent Literature 2
Japanese Patent Application Publication, Tokukaihei, No. 2-92187 A (Publication Date: Mar. 30, 1990)

SUMMARY OF INVENTION

Technical Problem

However, the conventional wireless receiving device disclosed in Patent Literature 1 turns on or off a power supply of the receiving section in response to every wireless transmission. This causes such a problem that the higher the frame frequency is, the lower an effect of reducing an amount of current to be consumed is.

Similarly, the stereographic-glass device disclosed in Patent Literature 2 turns on or off a receiving gate in response to every wireless transmission, thereby causing such a problem that the higher the frame frequency is, the higher an effect by noise becomes.

The present invention is accomplished in view of the above conventional problems. An object of the present invention is to provide stereographic glasses that can reduce an amount of current to be consumed and improve noise resistance, even when the frame frequency is high.

Solution to Problem

In order to achieve the above object, stereographic glasses according to the present invention includes: a wireless-signal receiving section for receiving synchronous signals for switching between a right-eye image and a left-eye image to be displayed on a display device and at least one piece of liquid crystal shutter control data each indicative of whether an image to be displayed is the right-eye image or the left-eye image; a timing generation section for generating, based on the synchronous signals thus received, timings for controlling opening and closing of respective liquid crystal shutters for a right lens and a left lens; a liquid crystal shutter control section for opening and closing the respective liquid crystal shutters at the timings thus generated by the timing generation section; liquid-crystal-shutter-equipped left and right lenses for which the respective liquid crystal shutters are provided; and reception-stop timing control means, which includes: a cycle detection section for detecting a cycle of the synchronous signals thus received, from a time interval between the synchronous signals; a cycle signal generation section for repeatedly generating, based on the cycle thus detected, cycle signals with the same cycle as the cycle thus detected; a memory section in which to store the at least one piece of liquid crystal shutter control data thus received by the wireless-signal receiving section; and a liquid crystal shutter control data generation section for repeatedly outputting the at least one piece of liquid crystal shutter control data thus stored in the memory section, at timings in sync with the cycle signals thus generated by the cycle signal generation section, the reception-stop timing control means (i) causing the wireless-signal receiving section to stop receiving signals, after the cycle detection section detects the cycle of the synchronous signals and the memory section stores therein the at least one piece of liquid crystal shutter control data, (ii) causing the timing generation section to generate the timings for controlling opening and closing of the respective liquid crystal shutters, based on the cycle signals generated from the cycle signal generation section and the at least one piece of liquid crystal shutter control data thus stored in the memory section, and (iii) causing the liquid crystal shutter control section to open and close the respective liquid crystal shutters at the timings thus generated.

In the present invention arranged as such, the reception-stop timing control means is so arranged as to: (i) cause the wireless-signal receiving section to stop receiving signals, after the cycle detection section detects a cycle of synchronous signals and the memory section stores therein liquid crystal shutter control data; (ii) cause the timing generation section to generate timings for controlling opening and closing of the liquid crystal shutters, based on cycle signals generated by the cycle signal generation section and the liquid crystal shutter control data thus stored in the memory section; and (iii) cause the liquid crystal shutter control section to open and close the liquid crystal shutters at the timings thus generated.

That is, in the present invention, the liquid crystal shutters can be controlled not only by synchronous signals and liquid crystal shutter control data in wireless signals received by the wireless-signal receiving section, but also by repeatedly generating (a) cycle signals, which are generated within the stereographic glasses, and (b) liquid crystal shutter control data that has been stored in the stereographic glasses.

As such, after the cycle detection section detects a cycle of the synchronous signals and the memory section stores the liquid crystal shutter control data therein, the reception of signals by the wireless-signal receiving section is stopped. As a result, no electric power is required for the wireless-signal receiving section to perform subsequent wireless communication. This makes it possible to reduce current consumption of the wireless-signal receiving section, which most consumes current within the stereographic glasses.

Further, after the reception of signals by the wireless-signal receiving section is stopped, the stereographic glasses are not affected by exogenous noise. This largely contributes to an improvement in noise resistance.

Thus, it is possible to provide stereographic glasses that can reduce an amount of current to be consumed and improve noise resistance, even when the frame frequency is high.

Advantageous Effects of Invention

According to the arrangement of the stereographic glasses in accordance with the present invention, it is possible to provide stereographic glasses that can reduce an amount of current to be consumed and improve noise resistance, even when the frame frequency is high.

Figure 2:
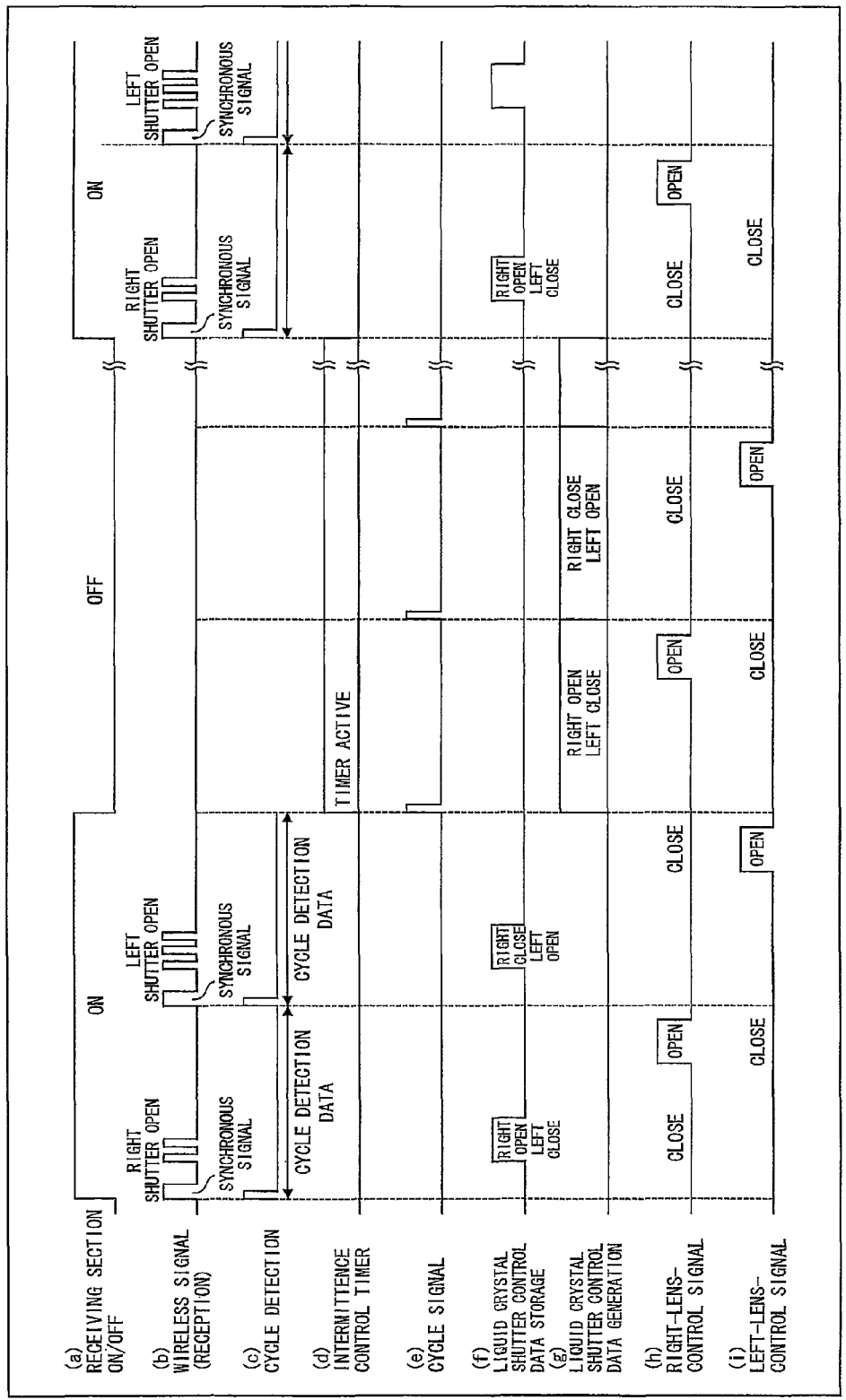

(a) to (i) of FIG. 2 illustrate a timing diagram of control operations in the stereographic glasses.

Figure 3:
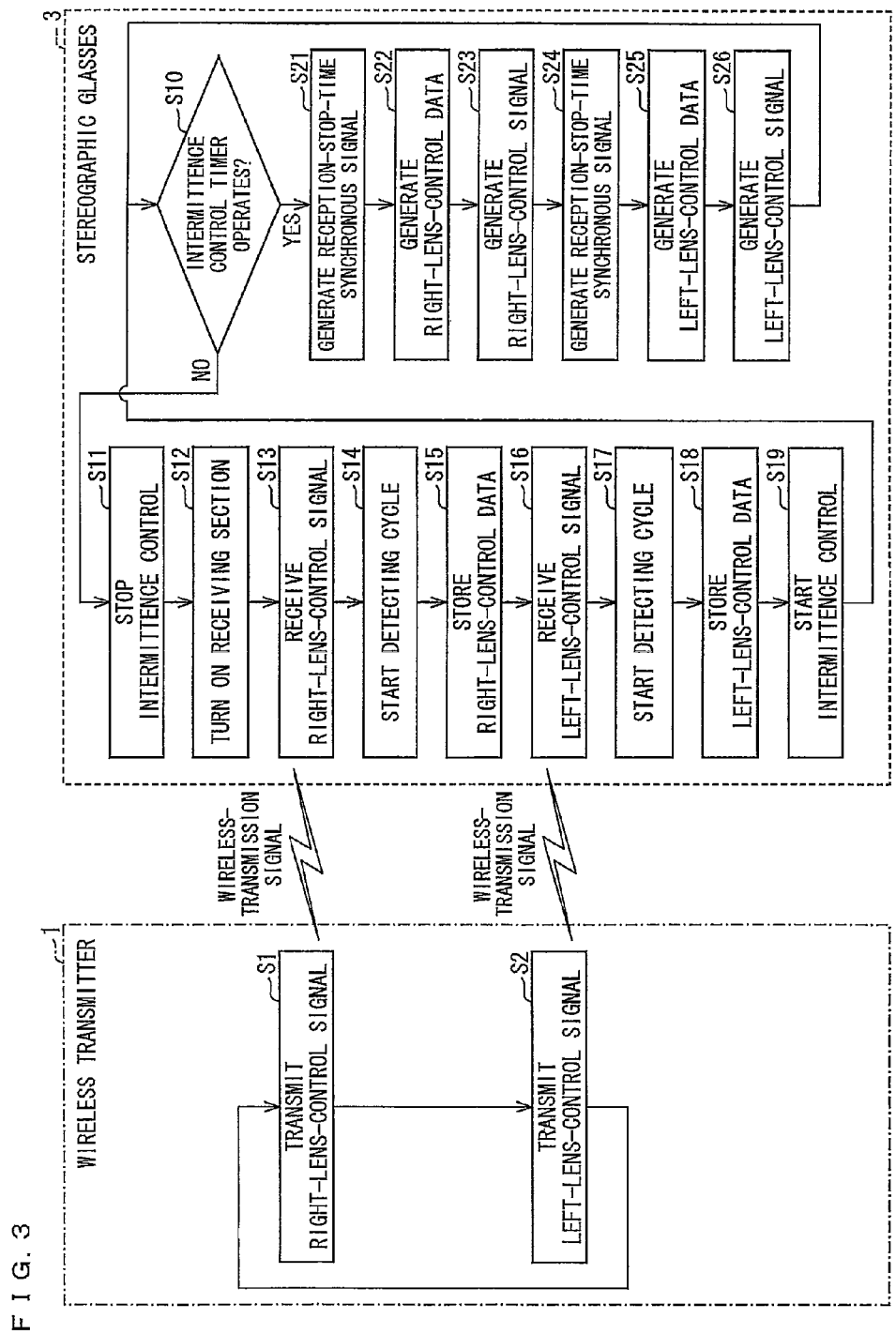

FIG. 3 is a flowchart illustrating control operations in the stereographic glasses.

Figure 4:
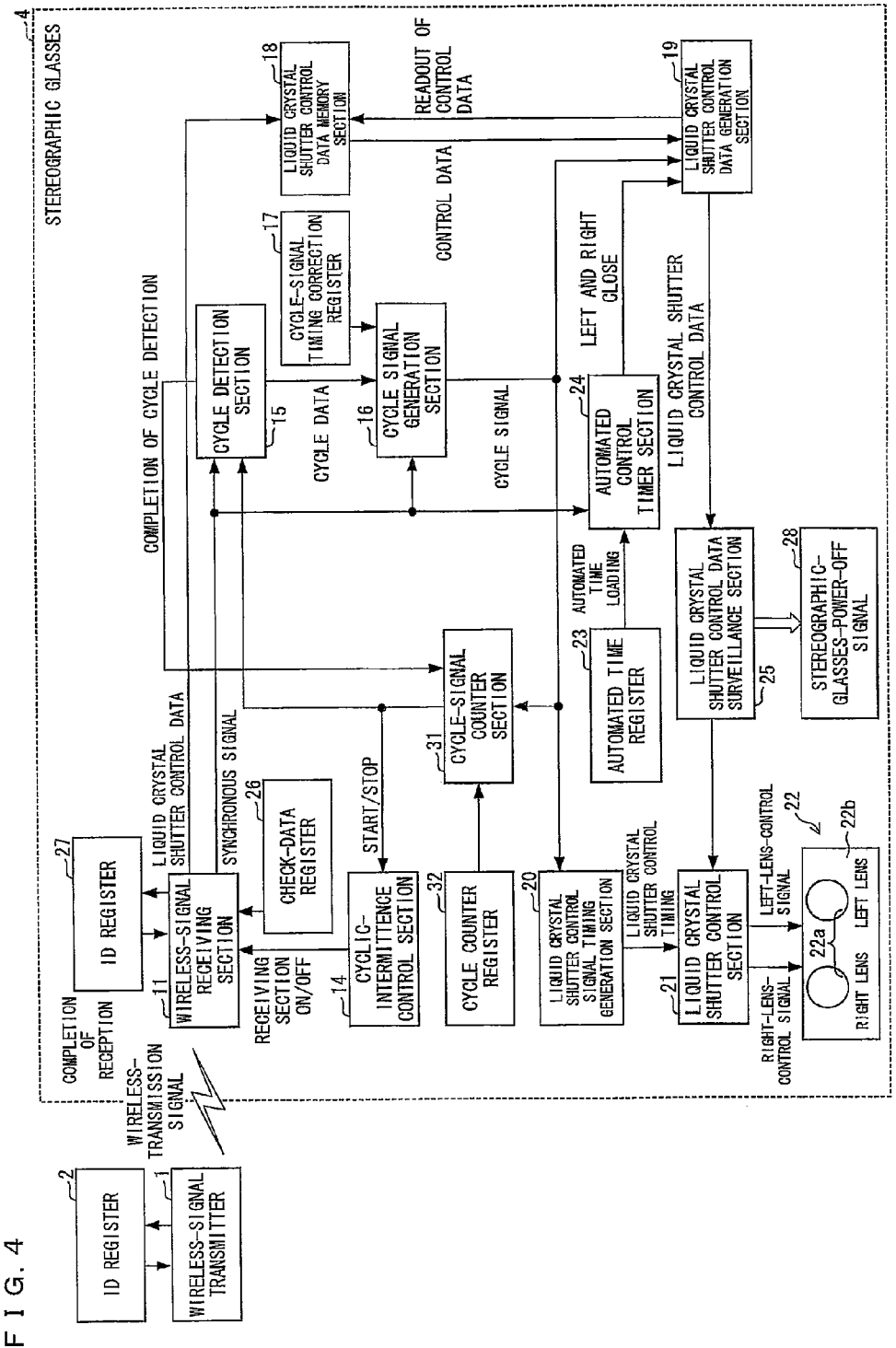

FIG. 4 illustrates stereographic glasses according to another embodiment of the present invention, and is a block diagram illustrating an arrangement of the stereographic glasses.

Figure 5:
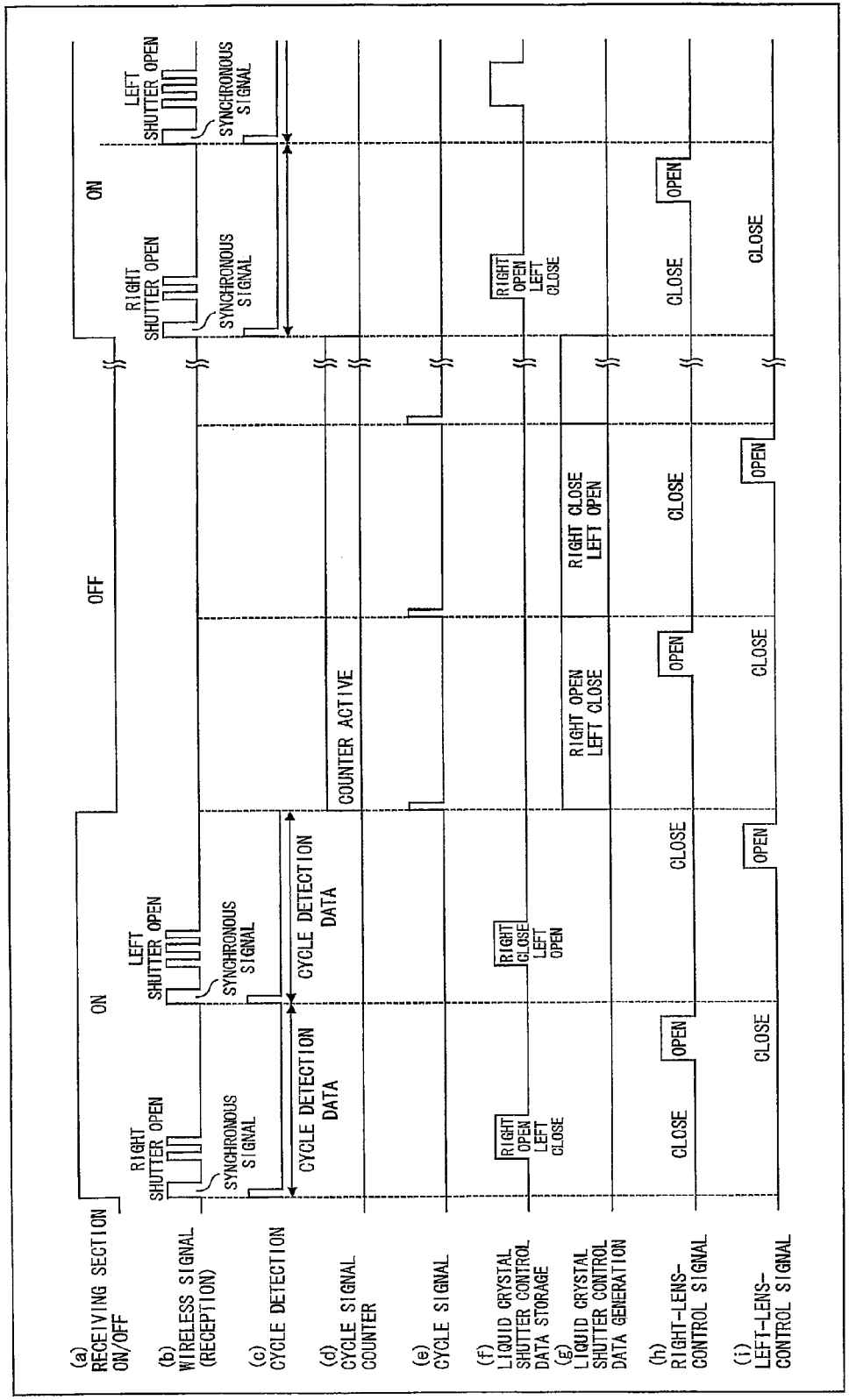

(a) to (i) of FIG. 5 illustrate a timing diagram of control operations in the stereographic glasses.

Figure 6:
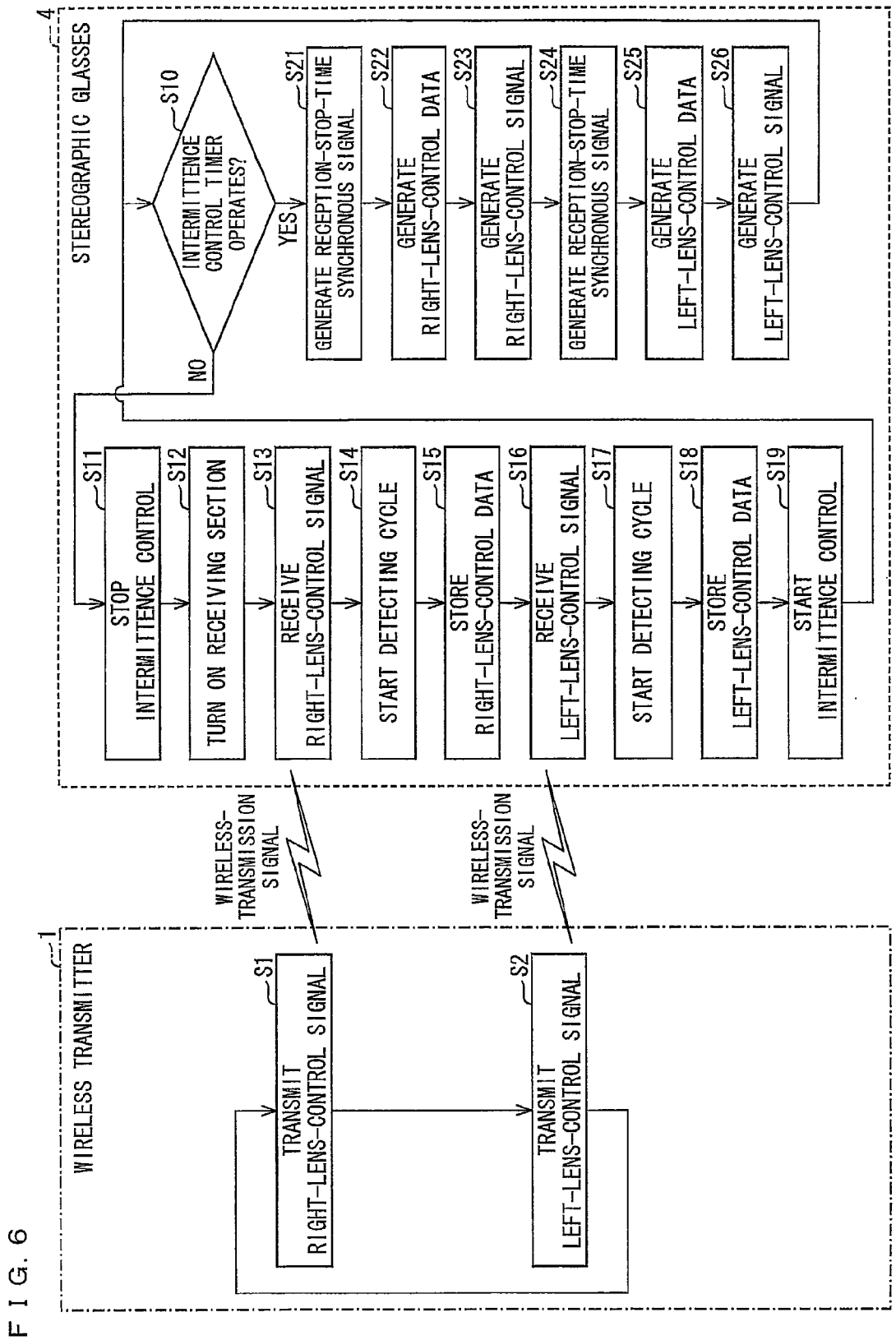

FIG. 6 is a flowchart illustrating control operations of the stereographic glasses.

Figure 7:
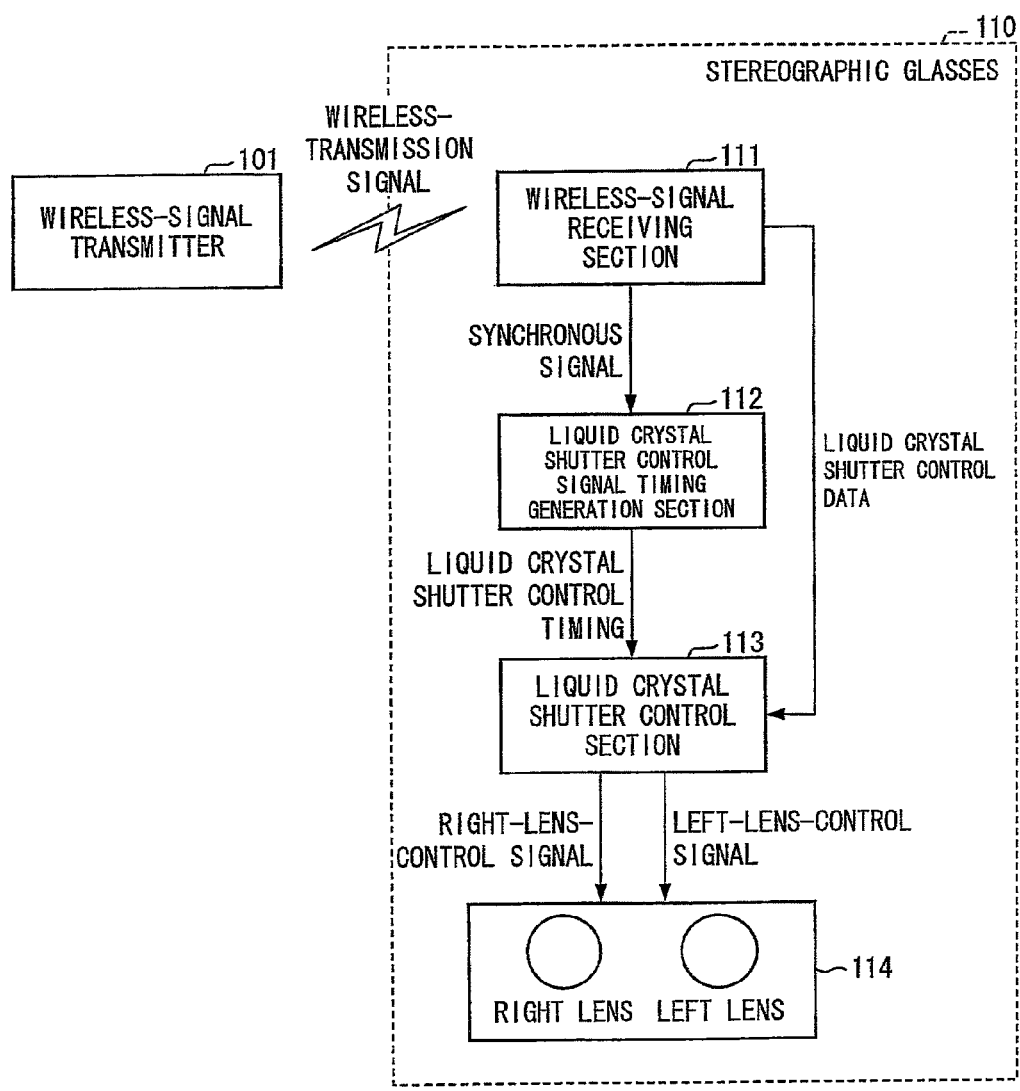

FIG. 7 is a block diagram illustrating an arrangement of conventional stereographic glasses.

Figure 8:
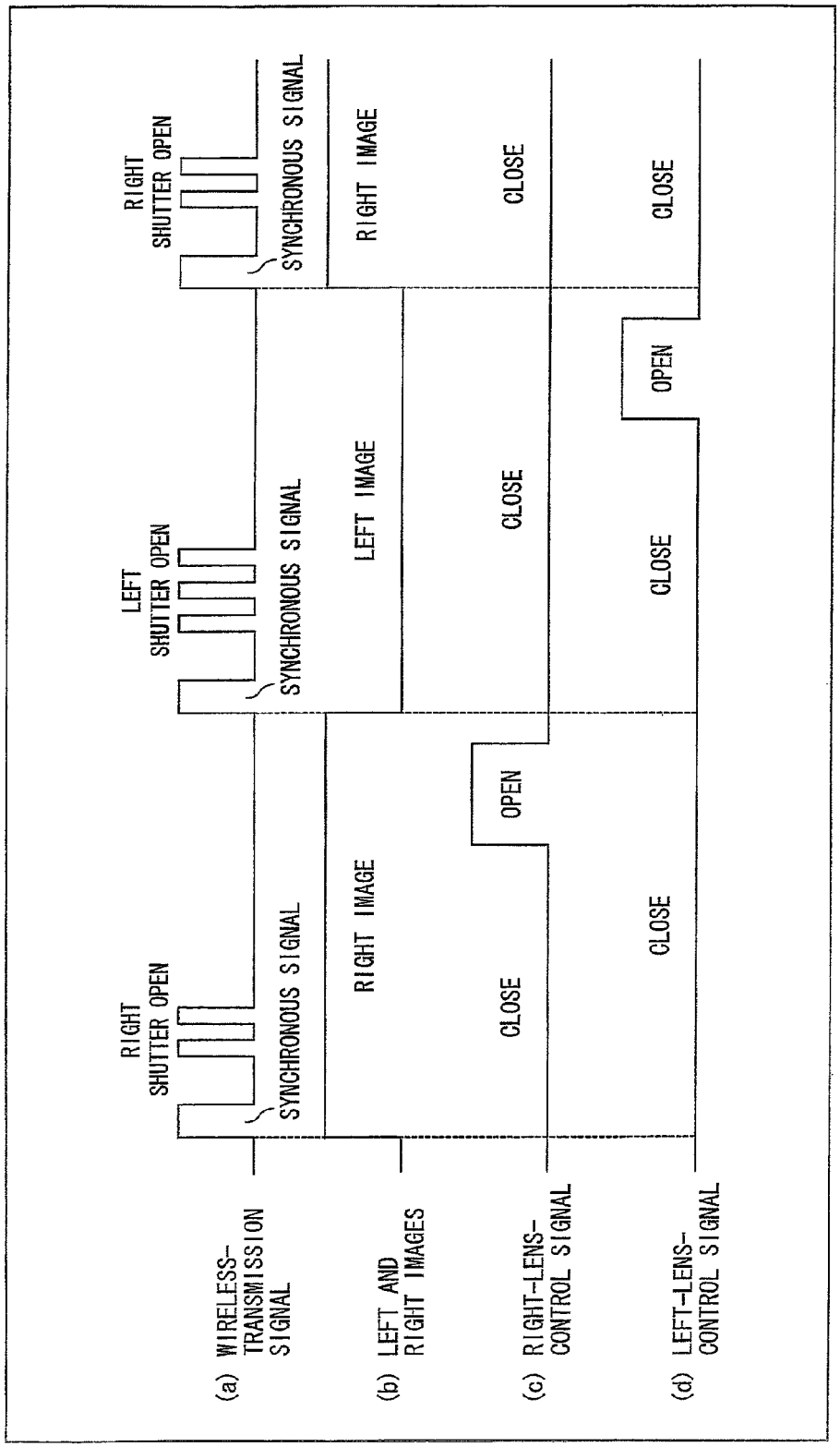

(a) to (d) of FIG. 8 illustrates a timing diagram of control operations of the stereographic glasses.

DESCRIPTION OF EMBODIMENTS

Embodiment 1

One embodiment of the present invention is described below with reference to FIG. 1 to FIG. 3.

[Overall]

Stereographic glasses according to the present embodiment receives, from a wireless-signal transmitter of a display device such as a TV (Television) or PC (Personal Computer)

display, a synchronous signal indicative of a timing of switching from a frame to a subsequent frame on the TV or PC display, as a wireless-transmission signal. When a right-eye image is to be displayed on the TV or PC display, the stereographic glasses also receive control information indicative of "right-eye open", which is transmitted together with a synchronous signal. In the meantime, when a left-eye image is to be displayed, the stereographic glasses also receive control information indicative of "left-eye open", which is transmitted together with a synchronous signal. Upon receiving the synchronous signals and the pieces of control information, the stereographic glasses combines these pieces of information thus received and converts them into (a) a liquid crystal shutter control signal for a right lens, which is synchronized with a timing of displaying the right-eye image on the display, or (b) a liquid crystal shutter control signal for a left lens, which is synchronized with a timing of displaying the left-eye image on the display. Thus, each of the right lens and the left lens of the stereographic glasses 3 is controlled in accordance with a corresponding liquid crystal shutter control signal. As a result, while the right-eye image is being displayed on the TV or PC display, only a shutter for the right lens is opened. In the meantime, while the left-eye image is being displayed, only a shutter for the left lens is opened.

[Arrangement of Display Device]

Figure 1:
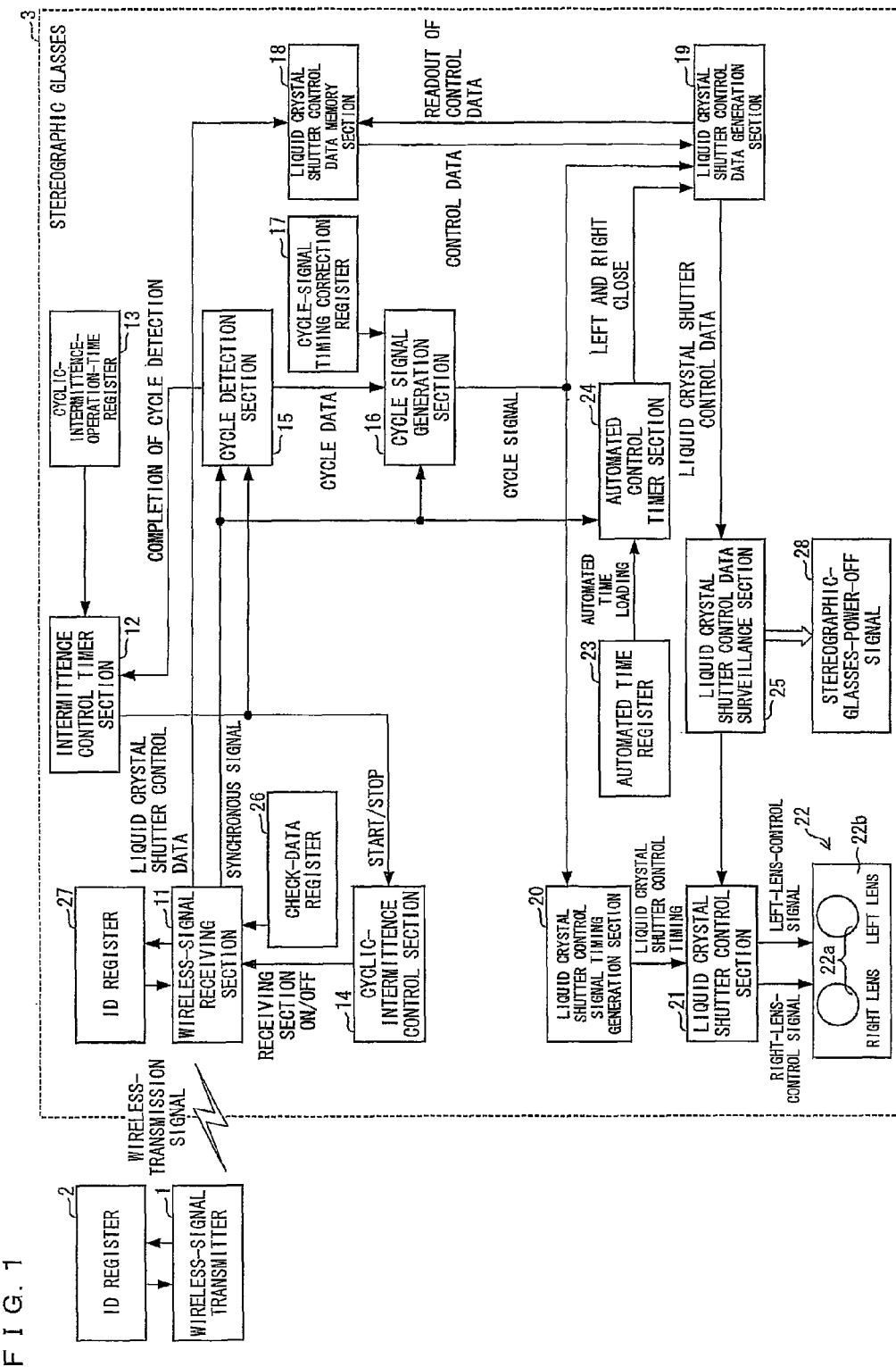
FIG. 1 illustrates stereographic glasses according to one embodiment of the present invention, and is a block diagram illustrating an arrangement of the stereographic glasses.

The following describes an arrangement of the stereographic glasses according to the present embodiment with reference to FIG. 1. FIG. 1 is a block diagram illustrating an arrangement of the stereographic glasses 3.

As illustrated in FIG. 1, the stereographic glasses 3 allow for stereoscopic vision of an image displayed on a display device, such as a TV or PC display, for example. In the TV or PC display (not shown), right-eye images and left-eye images are alternately displayed. When an image displayed on the TV or PC display is refreshed, a wireless-signal transmitter 1, which is provided in the TV or PC display, transmits to the stereographic glasses 3 a synchronous signal and liquid crystal shutter control data indicative of whether a refreshed image is a right-eye image or a left-eye image.

As the wireless signal, an infrared signal or an electrical-wave signal can be used.

When the wireless-signal transmitter 1 transmits the synchronous signal and the liquid crystal shutter control data, the wireless-signal transmitter 1 may transmit an ID (Identification) as an identifier together with the synchronous signal and the liquid crystal shutter control data, so as to prevent crosstalk. In view of this, the TV or PC display is provided with an ID register 2 that stores therein an ID identical with that of the stereographic glasses 3 with which the TV or PC display wirelessly communicates.

Further, when the wireless-signal transmitter 1 transmits the synchronous signal and the liquid crystal shutter control data, the wireless-signal transmitter 1 may transmit check data constituted by a predetermined value, so that the stereographic glasses 3 can check whether received data is affected by exogenous noise or not.

[Arrangement of Stereographic Glasses]

On the other hand, as illustrated in FIG. 1, the stereographic glasses 3 includes: a wireless-signal receiving section 11; a liquid crystal shutter control signal timing generation section 20 as a timing generation section; a liquid crystal shutter control section 21; and liquid-crystal-shutter-equipped left and right lenses 22, which include left and right lenses 22a and liquid crystal shutters 22b.

The wireless-signal receiving section 11 is a member for receiving wireless signals, more specifically, a synchronous signal, liquid crystal shutter control data, an ID, check data, and the like, which are transmitted from the wireless-signal transmitter 1.

The ID is checked against an ID stored in an ID register 27. That is, the ID register 27 stores an ID identical with that of the wireless-signal transmitter 1 with which the stereographic glasses 3 wirelessly communicate. The ID stored in the ID register 27 is checked against the ID included in the wireless signals thus received. When they are identical with each other, the wireless signals thus received are recognized as authentic data destined to the stereographic glasses 3 themselves. The stereographic glasses 3 are provided with a microcomputer, which is not shown in FIG. 1, though, and intended ID data is stored in the microcomputer in advance so that the ID data is automatically stored in the ID register 27 from the microcomputer.

Further, the check data thus received is checked against check data stored in a check-data register 26. That is, a predetermined value identical with a value to be transmitted from the wireless-signal transmitter 1 together with the synchronous signal and the liquid crystal shutter control data is stored in the check-data register 26 in advance. The predetermined value stored in the check-data register 26 is compared with the check data included in the wireless signals thus received. When they are identical with each other, received data is recognized as reliable data. Intended check data is stored in the check-data register 26 via the microcomputer (not shown), in the similar manner to the above.

The liquid crystal shutter control signal timing generation section 20 generates and supplies most suitable timings (liquid crystal shutter control timings) as timings for controlling the liquid crystal shutters 22b for the left and right lenses 22a provided in the liquid-crystal-shutter-equipped left and right lenses 22, based on cycle signals generated by the after-mentioned cycle signal generation section 16.

The liquid crystal shutter control section 21 generates a left-lens-control signal and a right-lens-control signal each at a corresponding liquid crystal shutter control timing supplied from the liquid crystal shutter control signal timing generation section 20, and then supplies them as control signals respectively for controlling the liquid crystal shutters 22b for the left and right lenses 22a. Which signal is to be generated, the left-lens-control signal or the right-lens-control signal, is determined based on data which indicates whether an image to be displayed is a left-eye image or a right-eye image and which is generated by the after-mentioned liquid crystal shutter control data generation section 19.

The liquid-crystal-shutter-equipped left and right lenses 22 operate to open and close the liquid crystal shutters 22b based on control signals supplied thereto.

In the present embodiment, the stereographic glasses 3 further include a cycle detection section 15, a cycle signal generation section 16, a liquid crystal shutter control data generation section 19, and a liquid crystal shutter control data memory section 18 as a memory section. Further, these members constitute a part of reception-stop timing control means.

The cycle detection section 15 detects synchronous signals supplied from the wireless-signal receiving section 11, and measures a time interval between the synchronous signals as cycle data. The cycle signal generation section 16 generates cycle signals with the same cycle as that of the cycle data supplied from the cycle detection section 15. The cycle signal generation section 16 generates the cycle signals immediately after the cycle detection section 15 finds that the reception of the synchronous signals is stopped.

The liquid crystal shutter control data generation section 19 operates in synch with cycle signals supplied from the cycle signal generation section 16. The liquid crystal shutter control data generation section 19 reads out right-eye data or left-eye data from the liquid crystal shutter control data memory section 18, and outputs it as liquid crystal shutter control data.

Further, upon receiving liquid crystal shutter control data supplied from the wireless-signal receiving section 11, the liquid crystal shutter control data memory section 18 determines whether the liquid crystal shutter control data thus received is a right-lens control signal or a left-lens control signal, or the like, and then stores it in its memory as data.

Additionally, in the present embodiment, the stereographic glasses 3 include an intermittence control timer section 12, a cyclic-intermittence-operation-time register 13, a cycle-signal timing correction register 17, a liquid crystal shutter control data surveillance section 25, an automated time register 23, and an automated control timer section 24. These members also constitute a part of the reception-stop timing control means according to the present invention.

The intermittence control timer section 12 includes a timer that manages time during which wireless reception is intermittently carried out. The cyclic-intermittence-operation-time register 13 stores therein time counted by the timer of the intermittence control timer section 12. Intended time data is also stored in the intermittence control timer section 12 via the microcomputer. The cyclic-intermittence control section 14 outputs a receiving-section OFF signal while the timer of the intermittence control timer section 12 counts time. When the timer stops, the cyclic-intermittence control section 14 outputs a receiving-section ON signal.

The cycle-signal timing correction register 17 corrects a time lag between a synchronous signal transmitted from the wireless-signal transmitter 1 and a synchronous signal received by the wireless-signal receiving section 11. An amount of the time lag is fixed in a single system, and stored as data in the cycle-signal timing correction register 17 via the microcomputer. The correction process can be carried out by shifting phases of cycle signals generated from the cycle signal generation section 16 in such a manner that only a first cycle for generating a cycle signal is shorten by an amount of time stored in the cycle-signal timing correction register 17.

When a predetermined state continues for a given period of time, the liquid crystal shutter control data surveillance section 25 turns off a power supply of the stereographic glasses 3 by outputting a stereographic-glasses-power-off signal 28. The predetermined state indicates such a state that both right-eye liquid crystal shutter control data and left-eye liquid crystal shutter control data, which are alternately outputted from the liquid crystal shutter control data generation section 19, indicate closing of the liquid crystal shutters 22*b*. In the other states, the output from the liquid crystal shutter control data generation section 19 is directly supplied to the liquid crystal shutter control section 21 without any modification.

When detecting discontinuance of synchronous signals supplied from the wireless-signal receiving section 11 for a given period of time stored in the automated time register 23, the automated control timer section 24 outputs a left-and-right-lens close signal indicating that both the right-eye liquid crystal shutter control data and the left-eye liquid crystal shutter control data indicate closing of the liquid crystal shutters 22*b*.

[Operation of Stereographic Glasses]

How the stereographic glasses 3 arranged as such operate as a whole is explained below with reference to the timing diagram illustrated in (a) to (i) of FIG. 2.

As illustrated in (a) of FIG. 2, the wireless-signal receiving section 11 operates only during an ON period in the receiving-section ON/OFF signal, and goes standby during an OFF period. This makes it possible to reduce an amount of current to be consumed. The receiving-section ON/OFF signal for the wireless-signal receiving section 11 is supplied from the cyclic-intermittence control section 14 to the wireless-signal receiving section 11. In view of this, in a case where the wireless-signal receiving section 11 stops receiving signals, when the timer of the intermittence control timer section 12 has counted a predetermined stop time, a start order is supplied from the intermittence control timer section 12 to the cyclic-intermittence control section 14. In response to the start order, the cyclic-intermittence control section 14 outputs a receiving-section ON signal so that the wireless-signal receiving section 11 restarts the reception.

Then, as illustrated in (b) of FIG. 2, the wireless-signal receiving section 11 receives at least synchronous signals and pieces of liquid crystal shutter control data respectively indicative of "right-shutter open" and "left-shutter open", while the receiving-section ON signal is being outputted. The timing diagram illustrated in (b) of FIG. 2 shows that the wireless-signal receiving section 11 receives liquid crystal shutter control data indicative of "right-shutter open" during the first cycle and receives liquid crystal shutter control data indicative of "left-shutter open" during the second cycle.

Subsequently, the wireless-signal receiving section 11 outputs the synchronous signals thus received from the wireless-signal transmitter 1, to the cycle detection section 15, as illustrated in (c) of FIG. 2. The cycle detection section 15 then generates cycle data by measuring a time interval between the synchronous signals. The cycle data is then supplied to the cycle signal generation section 16, and the cycle signal generation section 16 generates cycle signals with the same cycle as that of the cycle data.

On the other hand, while the wireless-signal receiving section 11 is performing reception operation, liquid crystal shutter control data received by the wireless-signal receiving section 11 is stored in the liquid crystal shutter control data memory section 18, as illustrated in (f) of FIG. 2.

As such, in the present embodiment, while the wireless-signal receiving section 11 is receiving signals, (i) the wireless-signal receiving section 11 obtains synchronous signals and liquid crystal shutter control data, (ii) the cycle detection section 15 outputs cycle data of the synchronous signals, and (iii) the liquid crystal shutter control data memory section 18 stores the liquid crystal shutter control data therein. After that, as illustrated in (a) of FIG. 2, the wireless-signal receiving section 11 stops receiving signals from the wireless-signal transmitter 1 for a given period of time determined by the cycle counter register 32, by causing the timer of the intermittence control timer section 12 to count time, as illustrated in (d) of FIG. 2.

While the wireless-signal receiving section 11 is stopping receiving signals, the wireless-signal transmitter 1 is stopping outputting the synchronous signals. Therefore, the wireless-signal receiving section 11 cannot receive any synchronous signal from the wireless-signal transmitter 1. However, in the present embodiment, while the wireless-signal receiving section 11 is stopping receiving signals, the cycle signal generation section 16 operates, as illustrated in (e) of FIG. 2, so as to generate cycle signals with the same cycle as that of the synchronous signals, based on the cycle data supplied from the cycle detection section 15. Then, the cycle signals with the same cycle as that of the synchronous signals are supplied to the liquid crystal shutter control data generation section 19 and the liquid crystal shutter control signal timing generation section 20. As a result, as illustrated in (g) of FIG. 2, in sync with the cycle signals, the liquid crystal shutter control data generation section 19 reads out liquid crystal shutter control data from the liquid crystal shutter control data memory section 18, and supplies the liquid crystal shutter control data to the liquid crystal shutter control data surveillance section 25. The liquid crystal shutter control data surveillance section 25 directly supplies the liquid crystal shutter control data to the liquid crystal shutter control section 21 without any modification, as illustrated in (h) and (i) of FIG. 2, unless liquid crystal shutter control data indicative of closing of the liquid crystal shutters 22b for both the left and right lenses 22a are continuously supplied for a given period of time.

The above operation is explained below with reference to FIG. 3. FIG. 3 is a flowchart illustrating a flow of the operation.

As illustrated in FIG. 3, first, the wireless-signal transmitter 1 continuously transmits, at timings of refreshing an image displayed on a TV display, liquid crystal shutter control data indicative of either the right-eye image or the left-eye image (S1, S2). Although not described here about details, when the stereographic glasses 3 are activated, they keep the wireless-signal receiving section 11 operating, and attempt to synchronize with the wireless-signal transmitter 1. Once the synchronization is established, the stereographic glasses 3 start the operation shown in FIG. 3.

Generally, switching information indicative of the order of switching between the right-eye image and the left-eye image to be displayed on the TV or PC display is consistent in a single program. That is, the cycle of synchronous signals for the right lens and the left lens, and the order of respective pieces of liquid crystal shutter control data indicative of a right-eye image and a left-eye image are consistent. In view of this, if the cycle of the synchronous signals and the pieces of liquid crystal shutter control data are obtained initially, it is not necessary for the wireless-signal receiving section 11 to receive every synchronous signal and every liquid crystal shutter control data, and it is possible to open and close the liquid crystal shutters 22b by use of the cycle of the synchronous signals initially obtained and the pieces of liquid crystal shutter control data initially obtained.

Initially, it is judged whether the timer of the intermittence control timer section 12 is operating or not (S10). Since the timer of the intermittence control timer section 12 does not operate at first (S11), the receiving-section ON/OFF signal, which is an output of the cyclic-intermittence control section 14, enters an ON state, thereby causing the wireless-signal receiving section 11 to perform reception operation (S12). After the wireless-signal receiving section 11 receives, as reception data, a synchronous signal and a right-lens control signal, for example (S13), the cycle detection section 15 operates to start measurement of a synchronous signal cycle of the synchronous signal thus received. That is, cycle detection starts (S14). Subsequently, right-lens control data is stored in the liquid crystal shutter control data memory section 18 (S15). After that, the same operation is performed on a left-lens control signal (S16 to S18). After the cycle data, the left-lens control data, and the right-lens control data are received, the timer of the intermittence control timer section 12 starts time counting for a given period of time. After that, the intermittence control timer section 12 supplies a reception stop order to the cyclic-intermittence control section 14. Then, the cyclic-intermittence control section 14 outputs a receiving-section OFF signal to the wireless-signal receiving section 11, thereby causing the wireless-signal receiving section 11 to stop receiving signals. That is, intermittent control starts (S19).

Accordingly, it is judged in S10 that the timer of the intermittence control timer section 12 is active, thereby causing the cycle signal generation section 16 to immediately start its operation of generating a reception-stop-time synchronous signal (synchronous signal for reception-stop time) with the same cycle of the synchronous signal (S21). In sync with the reception-stop-time synchronous signal, the liquid crystal shutter control data generation section 19 reads out corresponding data from the liquid crystal shutter control data memory section 18. Subsequently, the liquid crystal shutter control data generation section 19 generates right-lens control data (S22), and then the liquid crystal shutter control section 21 outputs a right-lens control signal at a liquid crystal shutter control timing outputted from the liquid crystal shutter control signal timing generation section 20 (S23). After that, in sync with a subsequent reception-stop-time synchronous signal (S24), the same operation as above is performed so that the liquid crystal shutter control section 21 outputs a left-lens control signal (S25, S26). These operations are repeated. When the intermittence control timer section 12 stops, the wireless-signal receiving section 11 is caused to operate again and synchronize with the wireless-signal transmitter 1, so that the wireless-signal receiving section 11 obtains information transmitted thereto.

Thus, with the use of the stereographic glasses 3 according to the present embodiment, it is possible not only to perform the reception of wireless signals in an intermit manner, but also to control wireless-signal-reception-stop time. As a result, it is possible to largely reduce electric-power consumption. Consequently, it is possible to use radio-wave type wireless communication, which consumes a large amount of electric power. Accordingly, it is not necessary to take account of such demerits as a limited communication distance and a strong directivity, which occur in conventional infrared communication. Further, it is possible to obtain a comfortable operational environment by wide and stable communication. Moreover, by taking the wireless-signal-reception-stop time longer, it is possible to provide stereographic glasses having improved resistance to exogenous noise.

As described above, the stereographic glasses 3 according to the present embodiment include: a wireless-signal receiving section 11 for receiving (a) synchronous signals for switching between a right-eye image and a left-eye image to be displayed on a display device such as a TV or PC display, and (b) liquid crystal shutter control data indicative of whether an image to be displayed is the right-eye image or the left-eye image; a liquid crystal shutter control signal timing generation section 20 for generating, based on the synchronous signal thus received, timings for controlling opening and closing of respective liquid crystal shutters 22b for a left lens and a right lens; a liquid crystal shutter control section 21 for opening and closing the respective liquid crystal shutters 22b at the timing thus generated by the liquid crystal shutter control signal timing generation section 20; and liquid-crystal-shutter-equipped left and right lenses 22 for which the liquid crystal shutters 22b are provided. The stereographic glasses 3 further include reception-stop timing control means that includes: a cycle detection section 15 for detecting a cycle of the synchronous signals thus received, from a time interval between the synchronous signals; a cycle signal generation section 16 for repeatedly generating, based on the cycle thus detected, cycle signals with the same cycle as the cycle thus detected; a liquid crystal shutter control data memory section 18 in which to store the liquid crystal shutter control data thus received by the wireless-signal receiving section 11; and a liquid crystal shutter control data generation section 19 for repeatedly outputting the liquid crystal shutter control data thus stored, at timings in sync with the cycle signal thus generated by the cycle signal generation section 16.

The reception-stop timing control means is so arranged as to: (i) cause the wireless-signal receiving section 11 to stop receiving signals, after the cycle detection section 15 detects a cycle of synchronous signals and the liquid crystal shutter control data memory section 18 stores therein the liquid crystal shutter control data; (ii) cause the liquid crystal shutter control signal timing generation section 20 to generate the timings for controlling opening and closing of the respective liquid crystal shutters 22b, based on the cycle signals generated from the cycle signal generation section 16 and the liquid crystal shutter control data thus stored in the liquid crystal shutter control data memory section 18; and (iii) cause the liquid crystal shutter control section 21 to open or close the liquid crystal shutters 22b, at the timings thus generated.

With the above arrangement, the reception-stop timing control means is so arranged as to: (i) cause the wireless-signal receiving section 11 to stop receiving signals, after the cycle detection section 15 detects a cycle of synchronous signals and the liquid crystal shutter control data memory section 18 stores therein liquid crystal shutter control data; (ii) cause the liquid crystal shutter control signal timing generation section 20 to generate timings for controlling opening and closing of the liquid crystal shutters 22b, based on cycle signals generated from the cycle signal generation section 16 and the liquid crystal shutter control data thus stored in the liquid crystal shutter control data memory section 18; and (iii) cause the liquid crystal shutter control section 21 to open and close the liquid crystal shutters 22b at the timings thus generated.

That is, in the present embodiment, the liquid crystal shutters 22b can be controlled not only by synchronous signals and liquid crystal shutter control data in wireless signals received by the wireless-signal receiving section 11, but also by repeatedly generating (a) cycle signals, which are generated within the stereographic glasses 3, and (b) liquid crystal shutter control data that has been stored in the stereographic glasses 3.

As such, after the cycle detection section 15 detects a cycle of the synchronous signals and the liquid crystal shutter control data memory section 18 stores the liquid crystal shutter control data therein, the reception of signals by the wireless-signal receiving section 11 is stopped. As a result, no electric power is required for the wireless-signal receiving section 11 to perform subsequent wireless communication. This makes it possible to reduce current consumption of the wireless-signal receiving section 11, which most consumes current within the stereographic glasses 3.

Further, after the reception of signals by the wireless-signal receiving section 11 is stopped, the stereographic glasses 3 are not affected by exogenous noise. This largely contributes to an improvement in noise resistance.

Thus, it is possible to provide the stereographic glasses 3 that can reduce an amount of current to be consumed and improve noise resistance, even when the frame frequency is high.

Moreover, in the stereographic glasses 3 according to the present invention, the reception-stop timing control means further includes: a cyclic-intermittence-operation-time register 13 in which to store time during which the wireless-signal receiving section 11 is caused to stop receiving signals; an intermittence control timer section 12 for counting time from when the cycle of the synchronous signals has been detected, to when the time thus counted reaches the time stored in the cyclic-intermittence-operation-time register 13; and a cyclic-intermittence control section 14 (a) for causing the wireless-signal receiving section 11 to stop receiving signals while the intermittence control timer section 12 is counting the time, and (b) for causing the wireless-signal receiving section 11 to start receiving signals when the intermittence control timer section 12 finishes counting the time.

In the above arrangement, the cyclic-intermittence control section 14 causes the wireless-signal receiving section 11 to stop and start receiving signals in accordance with time management by the intermittence control timer section 12. Consequently, the stereographic glasses 3 intermittently receive wireless-transmission signals, thereby making it possible to reduce the number of reception times. Further, while the wireless-signal receiving section 11 is caused to stop wireless reception, it is possible to reduce electric-power consumption of the wireless-signal receiving section 11.

This arrangement is more effective in a case where the wireless communication is carried out by a radio-wave method. While the wireless-signal receiving section 11 stops receiving signals, it goes standby, thereby making it possible to minimize consumption of current during the operation of the stereographic glasses 3. Consequently, it is possible to significantly reduce current consumption of the wireless-signal receiving section 11, which most consumes current in the stereographic glasses 3. Some latest models of the wireless-signal receiving section 11 have a mode in which current is hardly consumed. With the use of this mode, the current consumption can be reduced to a level equivalent to a level obtained when a power supply is turned off. Further, since the power supply is not utterly turned off, it advantageously takes less time to shift to an active state. In this case, it is not necessary to turn off the power supply of the wireless-signal receiving section 11.

Further, not only the effect on the current to be consumed, but there is also such an advantage that the stereographic glasses 3 is less affected by exogenous noise because the number of reception times in the wireless-signal receiving section 11 is reduced, which largely contributes to an improvement of noise resistance.

More specifically, for a frame frequency of 100 Hz, for example, a receiving interval is 10 ms, and therefore, it takes 20 ms to receive information of a single right-eye image and information of a single left-eye image. While the information of the single right-eye image and the information of the single left-eye image are being received, a cycle of synchronous signals is detected and respective pieces of liquid crystal shutter control data for left and right lenses 22a are stored. Subsequently, the wireless-signal receiving section 11 stops receiving wireless signals, and cycle signals with the same cycle as the cycle thus detected are produced. For example, if the respective pieces of liquid crystal shutter control data thus stored for the right-eye image and the left-eye image are continuously generated for 980 ms, an active period of the wireless-signal receiving section 11 is 20 ms and an inactive period thereof is 980 ms within a second. That is, an average current to be consumed by the wireless-signal receiving section 11 is obtained in accordance with an expression, "current during operation×1/50+current during standby×49/50". Note that the wireless-signal receiving section does not perform reception operation consistently for 10 ms, actually, and therefore, the average current to be consumed will be deceased more.

In some cases, the following trouble may occur. That is, time differences occur between display-refreshing timings of the TV or PC display and the synchronous signals received by the stereographic glasses 3 due to the wireless-communication process. This causes a difference in timing between (i)

displaying of a right-eye image and a left-eye image on the TV or PC display and (ii) opening-closing of the liquid crystal shutters 22*b* of the stereographic glasses 3.

In view of this, in the stereographic glasses 3 according to the present embodiment, the reception-stop timing control means includes a cycle-signal timing correction register 17 in which to store a setting time for time correction performed on a timing of generation of a cycle signal from the cycle signal generation section 16. With the arrangement, it is possible to adjust the cycle by the setting time, thereby making it possible to correct the cycle generated in the stereographic glasses 3. This can restrain the occurrence of the difference in timing of synchronization by shortening just once the cycle by the setting time stored in the cycle-signal timing correction register 17, when a cycle signal is generated in the stereographic glasses 3.

(クレーム5)

Further, in the stereographic glasses 3 according to the present embodiment, the liquid crystal shutter control data memory section 18 of the reception-stop timing control means stores therein a plurality of pieces of liquid crystal shutter control data received by the wireless-signal receiving section 11.

Further, in the stereographic glasses 3 according to the present embodiment, the liquid crystal shutter control data generation section 19 of the reception-stop timing control means sequentially reads out the plurality of pieces of liquid crystal shutter control data thus stored, at the timings in sync with the cycle signals generated, and repeatedly outputs the plurality of pieces of liquid crystal shutter control data thus read out. This arrangement allows the stereographic glasses 3 to perform not only such a simple operation of just repeating opening and closing of the liquid crystal shutters respectively for the left and right lenses in an alternate manner, but also such an operation of repeating the following processes, for example: (i) the liquid crystal shutter for the right lens is opened; (ii) both of the liquid crystal shutters are closed; (iii) the liquid crystal shutter for the left lens is opened; (iv) both of the liquid crystal shutters are closed; (v) the liquid crystal shutter for the right lens is opened; (vi) both of the liquid crystal shutters are closed; and (vii) the liquid crystal shutter for the left lens is opened.

Further, in the stereographic glasses 3 according to the present embodiment, the reception-stop timing control means includes a liquid crystal shutter control data surveillance section 25 for generating a signal for turning off a stereographic-glass driving power supply, when such a state that indicating that the image to be displayed is the right-eye image and liquid crystal shutter control data indicating that the image to be displayed is the left-eye image both indicate closing of the liquid crystal shutters 22*b* for a given period of time. With the above arrangement, it is possible to turn off the stereographic-glass power supply in a case where liquid crystal shutter control data for the right-eye image and liquid crystal shutter control data for the left-eye image both indicate closing of the liquid crystal shutters 22*b* for a given period of time for some reasons.

Further, in the stereographic glasses 3 according to the present invention, the reception-stop timing control means includes an automated control timer section 24 for outputting data indicating that the liquid crystal shutter control data indicating that the image to be displayed is the right-eye image and the liquid crystal shutter control data indicating that the image to be displayed is the left-eye image both indicate closing of the respective liquid crystal shutters 22*b* when no synchronous signal is receivable by the wireless-signal receiving section 11 for a predetermined period of time; and an automated time register 23 in which to store the predetermined period of time.

In the arrangement, when a timer of the automated control timer section 24 shows an end of the predetermined period of time, the automated control timer section 24 outputs data indicating that the liquid crystal shutter control data for the right-eye image and the liquid crystal shutter control data for the left-eye image both indicate closing of the respective liquid crystal shutters 22*b*. On this account, even if the signal reception by the wireless-signal receiving section 11 is stopped for a while, the stereographic glasses 3 keep working. However, if the signal reception by the wireless-signal receiving section 11 is stopped over a predetermined period of time, it is possible to turn off the stereographic-glass power supply, for example.

One example of a presumable case is such that: in a case where the wireless-signal receiving section 11 is caused to intermittently stop and start signal reception in accordance with time management by the timer of the intermittence control timer section 12, even if the wireless-signal receiving section 11 restarts the signal reception, the wireless-signal receiving section 11 receives no response from the TV or PC display because the power of the TV or PC display itself is turned off.

Further, in the stereographic glasses 3 according to the present embodiment, it is preferable that the wireless-signal receiving section 11 receive the synchronous signals and the liquid crystal shutter control data via infrared communication or radio-wave communication. The present embodiment is more effective when the radio-wave communication, which consumes more current, is performed.

Further, in the stereographic glasses 3 according to the present embodiment, in a case where the wireless-signal receiving section 11 performs the radio-wave communication, it is preferable that an available frequency be variable within a range of communicable frequencies.

In the arrangement, the radio-wave communication is performed such that the available frequency can be changed within the range of communicable frequencies. With this arrangement, even in a case where another apparatus has already used a given frequency, it is possible to use another frequency except for the given frequency. As a result, it is possible to avoid crosstalk or interference.

Further, the stereographic glasses 3 according to the present embodiment further includes an ID register 27 capable of setting an identifier, in a case where the wireless-signal receiving section 11 performs the radio-wave communication, and the synchronous signals and the liquid crystal shutter control data are regarded authentic only when an identifier included in the signals thus received is identical with the identifier set by the ID register 27. With this arrangement, even in a case where there are some pairs of stereographic glasses having the same frequency and function within an area in which the wireless communication can be performed, it is possible to avoid crosstalk by setting these pairs of stereographic glasses to have different identifiers from each other.

Moreover, it is preferable that the stereographic glasses 3 according to the present embodiment include the ID register 27 capable of setting an identifier in a case where the wireless-signal receiving section 11 performs the radio-wave communication, and the synchronous signals and the liquid crystal shutter control data be regarded authentic when an identifier included in the signals thus received is not identical with the identifier set by the ID register 27 but indicates a specific value. In the above arrangement, in a case where the identifier included in the signals thus received indicates a specific value, the reception of the synchronous signals and the liquid crystal shutter control data is allowed. Accordingly, even in a case where there are some pairs of stereographic glasses 3 which have the same frequency and function and which have different identifiers within an area in which the wireless communication can be performed, these pairs of stereographic glasses both can receive the same synchronous signal and liquid crystal shutter control data at the same time.

Further, in the stereographic glasses 3 according to the present embodiment, it is preferable that the identifier set by the ID register 27 be rewritable by a user operation. This makes it possible to change which pair of stereographic glasses 3 is to be connected as a counterpart.

It is preferable that the stereographic glasses 3 according to the present embodiment further include a check-data register 26 in which check data predetermined for signals to be transmitted is stored, and when the wireless-signal receiving section 11 receives the signals and a given part of the signal thus received is identical with the check data thus stored in the check-data register 26, the synchronous signals and the liquid crystal shutter control data in the signals thus received are regarded as authentic. With the arrangement, even in a case where the stereographic glasses 3 are affected by exogenous noise, it is possible to evaluate reliability of the synchronous signals and the liquid crystal shutter control data, thereby making it possible to prevent malfunction of the stereographic glasses 3 that is caused due to unauthentic synchronous signals and unauthentic liquid crystal shutter control data.

Moreover, the stereographic glasses 3 according to the present embodiment is preferably arranged such that in a case where the wireless-signal receiving section 11 performs the radio-wave communication, a reception frequency is variable per cycle or per set of cycles. For example, assume a case where the stereographic glasses 3 are affected by exogenous noise, or a case where the stereographic glasses 3 are interfered because another stereographic glasses 3 use the same frequency. In this case, in the present embodiment, the stereographic glasses 3 change their reception frequency per cycle or per set of cycles when performing the radio-wave communication.

If synchronous signals and liquid crystal shutter control data to be received are interfered, they cannot be used. However, with the above arrangement, it is possible to receive the synchronous signal and liquid crystal shutter control data via a different frequency in a subsequent cycle, a cycle after the subsequent cycle, or the like cycle. Accordingly, it is possible to continue the operation of the stereographic glasses 3. As a result, the stereographic glasses 3 do not cause malfunction, and can continue their operation, though data reception is slightly delayed.

For example, in a case where 5 channels can be used in a range of communicable frequencies, data transmission and reception may be performed such that the first cycle uses ch 2, the second cycle uses ch 2, the third cycle uses ch 3, the fourth cycle uses ch 4, the fifth cycle uses ch 5, and the sixth cycle reverts to ch 1. After the sixth cycle, the data transmission and reception may be repeatedly preformed in the order of the above. Naturally, a transmission side and a reception side should perform their operation by changing their channels in response to each other.

Embodiment 2

Another embodiment of the present invention is described below with reference to FIG. 4 to FIG. 6. Arrangements other than the arrangements to be explained in the present embodiment are the same as those explained in Embodiment 1. Further, for convenience of explanation, members having the same functions as corresponding members shown in the drawings explained in Embodiment 1 are referred to by the same reference signs as those of the corresponding members, and are not explained in this embodiment.

In the stereographic glasses 3 according to Embodiment 1, the operation of the wireless-signal receiving section 11 is intermittently managed by use of the timer of the intermittence control timer section 12 in accordance with time that is set in the cyclic-intermittence-operation-time register 13.

However, the present invention is not necessarily limited to the above arrangement. Another example of how to manage the wireless-signal receiving section 11 may be such a method in which the operation of the wireless-signal receiving section 11 is intermittently controlled by counting the number of cycle signals generated by the cycle signal generation section 16, which will be described in the present embodiment.

An arrangement of stereographic glasses 4 according to the present embodiment, which employ the above method, is described below with reference to FIG. 4. FIG. 4 is a block diagram illustrating the arrangement of the stereographic glasses 4.

The stereographic glasses 4 according to the present embodiment includes a cycle-signal counter section 31 and a cycle counter register 32, instead of the intermittence control timer section 12 and the cyclic-intermittence-operation-time register 13 provided in the stereographic glasses 3 in Embodiment 1. The cycle-signal counter section 31 and the cycle counter register 32 constitute a part of the reception-stop timing control means according to the present invention.

The cycle-signal counter section 31 counts the number of cycle signals generated by the cycle signal generation section 16. Then, the cycle-signal counter section 31 is arranged in a similar manner to the intermittence control timer section 12 according to Embodiment 1. That is, while the cycle-signal counter section 31 is not counting the number of the cycle signals, a cyclic-intermittence control section 14 outputs a receiving-section ON signal. On the other hand, while the cycle-signal counter section 31 is counting the number of cycle signals, a receiving-section OFF signal is outputted from the cyclic-intermittence control section 14. The cycle-signal counter section 31 counts the number of times preset in the cycle counter register 32.

How to control the operation of the stereographic glasses 4 arranged as such is illustrated in a timing diagram of (a) to (i) of FIG. 5. Further, a flow of how to control the operation of the stereographic glasses 4 is illustrated in FIG. 6.

(a) to (i) of FIG. 5 are different from (a) to (i) of FIG. 2 according to Embodiment 1 only in that a "cycle signal counter" in (d) of FIG. 5 is in a "counter active" state when a receiving section is OFF, while the "intermittence control timer" in (d) of FIG. 2 is in a "timer active" state when the receiving section is OFF.

Further, the flowchart of FIG. 6 is different from FIG. 3 according to Embodiment 1 only in that stereographic glasses shown in FIG. 6 are indicated by "stereographic glasses 4", while stereographic glasses shown in FIG. 3 are indicated by "stereographic glasses 3".

For this reason, the explanations about (a) to (i) of FIG. 5 are omitted because those are almost the same as the explanations about (a) to (i) of FIG. 2 according to Embodiment 1. Similarly, the explanation about FIG. 6 is omitted because that is almost the same as the explanation about FIG. 3 according to Embodiment 1.

As such, in the stereographic glasses 4 according to the present embodiment, reception-stop timing control means includes: a cycle counter register 32 in which to store the number of cycle signals corresponding to time during which the wireless-signal receiving section 11 is caused to stop receiving signals; a cycle-signal counter section 31 for counting the number of cycle signals from when the cycle of the synchronous signals has been detected, to when the number of cycle signals thus counted reaches the number of cycle signals stored in the cycle counter register 32; and a cyclic-intermittence control section 14 for causing the wireless-signal receiving section 11 to stop receiving signals while the cycle-signal counter section 31 is counting the number of cycle signals, and for causing the wireless-signal receiving section 11 to start receiving signals when the cycle-signal counter section 31 finishes counting the number of cycle signals.

In the above arrangement, the cyclic-intermittence control section 14 causes the wireless-signal receiving section 11 to stop and start receiving signals in accordance with count-time management by the cycle-signal counter section 31, which counts the number of cycle signals corresponding to a period of time during which the wireless-signal receiving section 11 is caused to stop receiving signals.

As a result, the stereographic glasses 4 intermittently receive wireless-transmission signals, thereby making it possible to reduce the number of reception times. While the wireless-signal receiving section 11 is caused to stop wireless reception, it is possible to reduce electric-power consumption of the wireless-signal receiving section 11.

This arrangement is more effective in a case where the wireless communication is performed by a radio-wave method. While the wireless-signal receiving section 11 stop receiving signals, it goes standby, thereby making it possible to minimize consumption of current during the operation of the stereographic glasses 4. Consequently, it is possible to significantly reduce current consumption of the wireless-signal receiving section 11, which most consumes current in the stereographic glasses 4. Some latest models of the wireless-signal receiving section 11 have a mode in which current is hardly consumed. With the use of this mode, the current consumption can be reduced to a level equivalent to a level obtained when a power supply is turned off. Further, since the power supply is not utterly turned off, it advantageously takes less time to shift to an active state. In this case, it is not necessary to turn off the power supply of the wireless-signal receiving section 11.

Further, not only the effect on current to be consumed, but there is also such an advantage that the stereographic glasses 4 are less affected by exogenous noise because the number of reception times in the wireless-signal receiving section 11 is reduced, which largely contributes to an improvement of noise resistance.

More specifically, for a frame frequency of 100 Hz, for example, a receiving interval is 10 ms, and therefore, it takes 20 ms to receive information of a single right-eye image and information of a single left-eye image. While the information of the single right-eye image and the information of the single left-eye image are being received, a cycle of synchronous signals is detected and respective pieces of liquid crystal shutter control data for left and right lenses are stored. Subsequently, by the wireless-signal receiving section 11 stops receiving wireless signals, and cycle signals with the same cycle as the cycle thus detected are produced. For example, if the respective pieces of liquid crystal shutter control data thus stored for the right-eye image and the left-eye image are continuously generated for 98 times in total, which is the number of generation of cycle signals, an average current to be consumed by the wireless-signal receiving section 11 is obtained in accordance with an expression, "current during operation×1/50+current during standby×49/50".

As described above, in the stereographic glasses according to the present invention, it is preferable that the reception-stop timing control means include: a cyclic-intermittence-operation-time register in which to store time during which the wireless-signal receiving section is caused to stop receiving signals; an intermittence control timer section for counting time from when the cycle of the synchronous signals has been detected, to when the time thus counted reaches the time stored in the cyclic-intermittence-operation-time register; and a cyclic-intermittence control section for causing the wireless-signal receiving section to stop receiving signals while the intermittence control timer section is counting the time, and for causing the wireless-signal receiving section to start receiving signals when the intermittence control timer section finishes counting the time.

In the above arrangement, the cyclic-intermittence control section causes the wireless-signal receiving section to stop and start receiving signals in accordance with time management by the intermittence control timer section.

Consequently, the stereographic glasses intermittently receive wireless-transmission signals, thereby reducing the number of reception times. Further, while the wireless-signal receiving section is caused to stop wireless reception, it is possible to reduce electric-power consumption of the wireless-signal receiving section.

This arrangement is more effective in a case where the wireless communication is carried out by a radio-wave method. While the wireless-signal receiving section stops receiving signals, it goes standby, thereby making it possible to minimize consumption of current during the operation of the stereographic glasses. Consequently, it is possible to significantly reduce current consumption of the wireless-signal receiving section, which most consumes current in the stereographic glasses. Some latest models of the wireless-signal receiving section have a mode in which current is hardly consumed. With the use of this mode, the current consumption can be reduced to a level equivalent to a level obtained when a power supply is turned off. Further, since the power supply is not utterly turned off, it advantageously takes less time to shift to an active state. In this case, it is not necessary to turn off the power supply of the wireless-signal receiving section.

Further, not only the effect on the current to be consumed, but there is also such an advantage that the stereographic glasses are less affected by exogenous noise because the number of reception times in the wireless-signal receiving section is reduced, which largely contributes to an improvement of noise resistance.

More specifically, for a frame frequency of 100 Hz, for example, a receiving interval is 10 ms, and therefore, it takes 20 ms to receive information of a single right-eye image and information of a single left-eye image. While the information of the single right-eye image and the information of the single left-eye image are being received, a cycle of synchronous signals is detected and respective pieces of liquid crystal shutter control data for left and right lenses are stored. Subsequently, the wireless-signal receiving section stops receiving wireless signals is stopped, and cycle signals with the same cycle as the cycle thus detected are produced. For example, if the respective pieces of liquid crystal shutter control data thus stored for the right-eye image and the left-eye image are continuously generated for 980 ms, an active period of the wireless-signal receiving section is 20 ms and an inactive period thereof is 980 ms within a second. That is, an average current to be consumed by the wireless-signal receiving section is obtained in accordance with an expression, "current during operation×1/50+current during standby×49/50". Note that the wireless-signal receiving section does not perform reception operation consistently for 10 ms, actually, and therefore, the average current to be consumed will be decreased more.

In the stereographic glasses according to the present invention, it is preferable that the reception-stop timing control means further include: a cycle counter register in which to store the number of cycles signals corresponding to time during which the wireless-signal receiving section is caused to stop receiving signals; a cycle-signal counter section for counting the number of cycle signals generated by the cycle signal generation section from when the cycle of the synchronous signals has been detected, to when the number of cycle signals thus counted reaches the number of cycle signals stored in the cycle counter register; and a cyclic-intermittence control section for causing the wireless-signal receiving section to stop receiving signals while the cycle-signal counter section is counting the number of cycle signals, and for causing the wireless-signal receiving section to start receiving signals when the cycle-signal counter section finishes counting the number of cycle signals.

In the above arrangement, the cyclic-intermittence control section causes the wireless-signal receiving section to stop and start receiving signals in accordance with count-time management by the cycle-signal counter section, which counts the number of cycle signals corresponding to a period of time during which the wireless-signal receiving section is caused to stop receiving signals.

As a result, the stereographic glasses intermittently receive wireless-transmission signals, thereby making it possible to reduce the number of reception times. While the wireless-signal receiving section is caused to stop wireless reception, it is possible to reduce electric-power consumption of the wireless-signal receiving section.

This arrangement is more effective in a case where the wireless communication is performed by a radio-wave method. While the wireless-signal receiving section stops receiving signals, it goes standby, thereby making it possible to minimize consumption of current during the operation of the stereographic glasses. Consequently, it is possible to significantly reduce current consumption of the wireless-signal receiving section, which most consumes current in the stereographic glasses. Some latest models of the wireless-signal receiving section have a mode in which current is hardly consumed. With the use of this mode, the current consumption can be reduced to a level equivalent to a level obtained when a power supply is turned off. Further, since the power supply is not utterly turned off, it advantageously takes less time to shift to an active state. In this case, it is not necessary to turn off the power supply of the wireless-signal receiving section.

Further, not only the effect on the current to be consumed, but there is also such an advantage that the stereographic glasses are less affected by exogenous noise because the number of reception times in the wireless-signal receiving section is reduced, which largely contributes to an improvement of noise resistance.

More specifically, for a frame frequency of 100 Hz, for example, a receiving interval is 10 ms, and therefore, it takes 20 ms to receive information of a single right-eye image and information of a single left-eye image. While the information of the single right-eye image and the information of the single left-eye image are being received, a cycle of synchronous signals is detected and respective pieces of liquid crystal shutter control data for left and right lenses are stored. Subsequently, the wireless-signal receiving section stops receiving wireless signals, and cycle signals with the same cycle as the cycle thus detected are produced. For example, if the respective pieces of liquid crystal shutter control data thus stored for the right-eye image and the left-eye image are continuously generated for 98 times in total, which is the number of generation of cycle signals, an average current to be consumed by the wireless-signal receiving section is obtained in accordance with an expression, "current during operation×1/50+current during standby×49/50".

In some cases, the following trouble may occur. That is, time differences occur between display-refreshing timings of a TV or PC display and synchronous signals received by the stereographic glasses due to the wireless-communication process. This causes a difference in timing between (i) displaying of a right-eye image and a left-eye image on the TV or PC display and (ii) opening and closing of the liquid crystal shutters of the stereographic glasses.

In the stereographic glasses according to the present invention, it is preferable that the reception-stop timing control means further includes a cycle-signal timing correction register in which to store setting time by which the timings of the cycle signals generated by the cycle signal generation section are corrected.

With the arrangement, it is possible to adjust the cycle by the setting time, thereby making it possible to correct the cycle generated in the stereographic glasses. This can restrain the occurrence of the difference in timing of synchronization by shortening just once the cycle by the setting time stored in the cycle-signal timing correction register, when a cycle signal is generated in the stereographic glasses.

The stereographic glasses according to the present invention is preferably arranged such that the at least one piece of liquid crystal shutter control data thus received by the wireless-signal receiving section includes a plurality of pieces of liquid crystal shutter control data, and the memory section of the reception-stop timing control means stores therein the plurality of pieces of liquid crystal shutter control data.

In the stereographic glasses according to the present invention, it is preferable that the liquid crystal shutter control data generation section of the reception-stop timing control means sequentially reads out the plurality of pieces of liquid crystal shutter control data thus stored in the memory section, at the timings in sync with the cycle signals thus generated, and repeatedly outputs the plurality of pieces of liquid crystal shutter control data thus read out.

This arrangement allows the stereographic glasses to perform not only such a simple operation of just repeating opening and closing of the liquid crystal shutters respectively for the left and right lenses in an alternate manner, but also such an operation of repeating the following processes, for example: (i) the liquid crystal shutter for the right lens is opened; (ii) both of the liquid crystal shutters are closed; (iii) the liquid crystal shutter for the left lens is opened; (iv) both of the liquid crystal shutters are closed; (v) the liquid crystal shutter for the right lens is opened; (vi) both of the liquid crystal shutters are closed; and (vii) the liquid crystal shutter for the left lens is opened.

In the stereographic glasses according to the present invention, it is preferable that the reception-stop timing control means further include a liquid crystal shutter control data surveillance section for generating a signal for turning off a stereographic-glass driving power supply, when such a state that liquid crystal shutter control data indicating that the image to be displayed is the right-eye image and liquid crystal shutter control data indicating that the image to be displayed is the left-eye image both indicate closing of the respective liquid crystal shutters continues for a given period of time.

With the above arrangement, it is possible to turn off the stereographic-glass power supply in a case where liquid crystal shutter control data for the right-eye image and liquid crystal shutter control data for the left-eye image both indicate closing of the liquid crystal shutters for a given period of time for some reasons.

In the stereographic glasses according to the present invention, it is preferable that the reception-stop timing control means further include: an automated control timer section for outputting data indicating that liquid crystal shutter control data indicating that the image to be displayed is the right-eye image and liquid crystal shutter control data indicating that the image to be displayed is the left-eye image both indicate closing of the respective liquid crystal shutters, when no synchronous signal is receivable by the wireless-signal receiving section for a predetermined period of time; and an automated time register in which to store the predetermined period of time.

In the arrangement, when a timer of the automated control timer section shows an end of the predetermined period of time, the automated control timer section outputs data indicating that the liquid crystal shutter control data for the right-eye image and the liquid crystal shutter control data for the left-eye image both indicate closing of the respective liquid crystal shutters.

On this account, even if the signal reception by the wireless-signal receiving section is stopped for a while, the stereographic glasses keep working. However, if the signal reception by the wireless-signal receiving section is stopped over a predetermined period of time, it is possible to turn off the stereographic-glass power supply, for example.

One example of a presumable case is such that: in a case where the wireless-signal receiving section is caused to intermittently stop and start signal reception in accordance with time management by the timer of the intermittence control timer section, for example, even if the wireless-signal receiving section restarts the signal reception, the wireless-signal receiving section receives no response from the TV or PC display because the power of the TV or PC display itself is turned off.

In the stereographic glasses according to the present invention, it is preferable that the wireless-signal receiving section receive the synchronous signals and the at least one pieces of liquid crystal shutter control data via infrared communication or radio-wave communication.

In the above arrangement, the wireless communication performed by the stereographic glasses is infrared communication or radio-wave communication. The present invention is more effective when the radio-wave communication, which consumes more current, is performed.

In the stereographic glasses according to the present invention, in a case where the wireless-signal receiving section performs the radio-wave communication, it is preferable that an available frequency be variable within a range of communicable frequencies.

In the above arrangement, the radio-wave communication is performed such that the available frequency can be changed within the range of communicable frequencies. With this arrangement, even in a case where another apparatus has already used a given frequency, it is possible to use another frequency except for the given frequency. As a result, it is possible to avoid crosstalk or interference.

It is preferable that the stereographic glasses according to the present invention further include an ID register capable of setting an identifier in a case where the wireless-signal receiving section performs the radio-wave communication, and the synchronous signals and the at least one piece of liquid crystal shutter control data be regarded as authentic only when an identifier included in the signals thus received is identical with the identifier set by the ID register.

With the above arrangement, even in a case where there are some pairs of stereographic glasses having the same frequency and function within an area in which the wireless communication can be performed, it is possible to avoid crosstalk by setting these pairs of stereographic glasses to have different identifiers from each other.

It is preferable that the stereographic glasses according to the present invention further include an ID register capable of setting an identifier in a case where the wireless-signal receiving section performs the radio-wave communication, and the synchronous signals and the at least one piece of liquid crystal shutter control data be regarded as authentic when an identifier included in the signals thus received is not identical with the identifier set by the ID register but indicates a specific value.

In the above arrangement, in a case where the identifier included in the signals thus received indicates a specific value, the reception of the synchronous signals and the liquid crystal shutter control data is allowed. Accordingly, even in a case where there are some pairs of stereographic glasses which have the same frequency and function and which have different identifiers within an area in which the wireless communication can be performed, these pairs of stereographic glasses both can receive the same synchronous signal and liquid crystal shutter control data at the same time.

Further, in the stereographic glasses according to the present invention, it is preferable that the identifier set by the ID register be rewritable by a user operation.

This makes it possible to change which pair of stereographic glasses is to be connected as a counterpart.

It is preferable that the stereographic glasses according to the present embodiment further include a check-data register in which check data predetermined for signals to be transmitted is stored, and when the wireless-signal receiving section receives the signals and a given part of the signals thus received is identical with the check data thus stored in the check-data register, the synchronous signals and the at least one piece of liquid crystal shutter control data in the signals thus received be regarded as authentic.

With the arrangement, even in a case where the stereographic glasses are affected by exogenous noise, it is possible to evaluate reliability of the synchronous signals and the liquid crystal shutter control data, thereby making it possible to prevent malfunction of the stereographic glasses that is caused due to an unauthentic synchronous signal and unauthentic liquid crystal shutter control data.

The stereographic glasses according to the present invention is preferably arranged such that in a case where the wireless-signal receiving section performs the radio-wave communication, a reception frequency is variable per cycle or per set of cycles.

For example, assume a case where the stereographic glasses are affected by exogenous noise, or a case where the stereographic glasses are interfered because another pair of stereographic glasses uses the same frequency. In this case, in the arrangement of the present invention, the stereographic glasses change their reception frequency per cycle or per set of cycles when performing the radio-wave communication.

If synchronous signals and liquid crystal shutter control data to be received are interfered, they cannot be used. However, with the above arrangement, it is possible to receive the synchronous signals and liquid crystal shutter control data via a different frequency in a subsequent cycle, a cycle after the subsequent cycle, or the like cycle. Accordingly, it is possible to continue the operation of the stereographic glasses.

As a result, the stereographic glasses do not cause malfunction, and can continue their operation, though data reception is slightly delayed.

For example, in a case where 5 channels can be used in a range of communicable frequencies, data transmission and reception may be performed such that the first cycle uses ch 2, the second cycle uses ch 2, the third cycle uses ch 3, the fourth cycle uses ch 4, the fifth cycle uses ch 5, and the sixth cycle reverts to ch 1. After the sixth cycle, the data transmission and reception may be repeatedly preformed in the order of the above. Naturally, a transmission side and a reception side should perform their operation by changing their channels in response to each other.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be applied to stereographic glasses which allows a view to see a three-dimensional image in such a manner that switching information on a right-eye image and a left-eye image displayed on a display of, for example, a TV (Television) or PC (Personal Computer) is received via wireless communication, and opening and closing of liquid crystal shutters for a right lens and a left lens are controlled in accordance with the switching information.

REFERENCE SIGNS LIST

1 Wireless-signal Transmitter
2 ID Register
3 Stereographic Glasses
4 Stereographic Glasses
11 Wireless-signal Receiving Section
12 Intermittence Control Timer Section
13 Cyclic-intermittence-operation-time Register
14 Cyclic-intermittence Control Section
15 Cycle detection section
16 Cycle signal Generation Section
17 Cycle-signal timing Correction Register
18 Liquid Crystal Shutter Control Data Memory Section (Memory Section)
19 Liquid Crystal Shutter Control Data Generation Section
20 Liquid Crystal Shutter Control Signal Timing Generation Section (Timing Generation Section)
21 Liquid Crystal Shutter Control Section
22 Liquid-Crystal-Shutter-Equipped Left and Right Lenses
22*a* Left and Right Lenses
22*b* Liquid Crystal Shutter
23 Automated Time Register
24 Automated Control Timer Section
25 Liquid Crystal Shutter Control Data Surveillance Section
26 Check-data Register
27 ID Register
28 Stereographic-glasses-power-off Signal
31 Cycle-signal Counter Section
32 Cycle Counter Register

The invention claimed is:
1. Stereographic glasses comprising:
a wireless-signal receiving section for receiving synchronous signals for switching between a right-eye image and a left-eye image to be displayed on a display device and at least one piece of liquid crystal shutter control data each indicative of whether an image to be displayed is the right-eye image or the left-eye image;
a timing generation section for generating, based on the synchronous signals thus received, timings for controlling opening and closing of respective liquid crystal shutters for a right lens and a left lens;
a liquid crystal shutter control section for opening and closing the respective liquid crystal shutters at the timings thus generated by the timing generation section;
liquid-crystal-shutter-equipped left and right lenses for which the respective liquid crystal shutters are provided; and
reception-stop timing control means, which includes:
a cycle detection section for detecting a cycle of the synchronous signals thus received, from a time interval between the synchronous signals;
a cycle signal generation section for repeatedly generating, based on the cycle thus detected, cycle signals with the same cycle as the cycle thus detected;
a memory section in which to store the at least one piece of liquid crystal shutter control data thus received by the wireless-signal receiving section; and
a liquid crystal shutter control data generation section for repeatedly outputting the at least one piece of liquid crystal shutter control data thus stored in the memory section, at timings in sync with the cycle signals thus generated by the cycle signal generation section,
the reception-stop timing control means (i) causing the wireless-signal receiving section to stop receiving signals, after the cycle detection section detects the cycle of the synchronous signals and the memory section stores therein the at least one piece of liquid crystal shutter control data, (ii) causing the timing generation section to generate the timings for controlling opening and closing of the respective liquid crystal shutters, based on the cycle signals generated from the cycle signal generation section and the at least one piece of liquid crystal shutter control data thus stored in the memory section, and (iii) causing the liquid crystal shutter control section to open and close the respective liquid crystal shutters at the timings thus generated,
wherein the reception-stop timing control means further includes:
a cycle counter register in which to store the number of cycles signals corresponding to time during which the wireless-signal receiving section is caused to stop receiving signals;
a cycle-signal counter section for counting the number of cycle signals generated by the cycle signal generation section from when the cycle of the synchronous signals has been detected, to when the number of cycle signals thus counted reaches the number of cycle signals stored in the cycle counter register; and
a cyclic-intermittence control section for causing the wireless-signal receiving section to stop receiving signals while the cycle-signal counter section is counting the number of cycle signals, and for causing the wireless-signal receiving section to start receiving signals when the cycle-signal counter section finishes counting the number of cycle signals.

2. The stereographic glasses as set forth in claim 1, wherein the reception-stop timing control means further includes a cycle-signal timing correction register in which to store setting time by which the timings of the cycle signals generated by the cycle signal generation section are corrected.

3. The stereographic glasses as set forth in claim 1, wherein:
the at least one piece of liquid crystal shutter control data thus received by the wireless-signal receiving section includes a plurality of pieces of liquid crystal shutter control data, and
the memory section of the reception-stop timing control means stores therein the plurality of pieces of liquid crystal shutter control data.

4. The stereographic glasses as set forth in claim 3, wherein the liquid crystal shutter control data generation section of the reception-stop timing control means sequentially reads out the plurality of pieces of liquid crystal shutter control data thus stored in the memory section, at the timings in sync with the cycle signals thus generated, and repeatedly outputs the plurality of pieces of liquid crystal shutter control data thus read out.

5. The stereographic glasses as set forth in claim 1, wherein the reception-stop timing control means further includes a liquid crystal shutter control data surveillance section for generating a signal for turning off a stereographic-glass driving power supply, when such a state that liquid crystal shutter control data indicating that the image to be displayed is the right-eye image and liquid crystal shutter control data indicating that the image to be displayed is the left-eye image both indicate closing of the respective liquid crystal shutters continues for a given period of time.

6. The stereographic glasses as set forth in claim 1, wherein the reception-stop timing control means further includes:
an automated control timer section for outputting data indicating that liquid crystal shutter control data indicating that the image to be displayed is the right-eye image and liquid crystal shutter control data indicating that the image to be displayed is the left-eye image both indicate closing of the respective liquid crystal shutters, when no synchronous signal is receivable by the wireless-signal receiving section for a predetermined period of time; and
an automated time register in which to store the predetermined period of time.

7. The stereographic glasses as set forth in claim 1, wherein the wireless-signal receiving section receives the synchronous signals and the at least one pieces of liquid crystal shutter control data via infrared communication or radio-wave communication.

8. The stereographic glasses as set forth in claim 7, wherein in a case where the wireless-signal receiving section performs the radio-wave communication, an available frequency is variable within a range of communicable frequencies.

9. The stereographic glasses as set forth in claim 7, further comprising an ID register capable of setting an identifier in a case where the wireless-signal receiving section performs the radio-wave communication,
the synchronous signals and the at least one piece of liquid crystal shutter control data being regarded as authentic only when an identifier included in the signals thus received is identical with the identifier set by the ID register.

10. The stereographic glasses as set forth in claim 7, further comprising an ID register capable of setting an identifier in a case where the wireless-signal receiving section performs the radio-wave communication,
the synchronous signals and the at least one piece of liquid crystal shutter control data being regarded as authentic when an identifier included in the signals thus received is not identical with the identifier set by the ID register but indicates a specific value.

11. The stereographic glasses as set forth in claim 9, wherein the identifier set by the ID register is rewritable by a user operation.

12. The stereographic glasses as set forth in claim 1, further comprising:
a check-data register in which check data predetermined for signals to be transmitted is stored,
when the wireless-signal receiving section receives the signals and a given part of the signals thus received is identical with the check data thus stored in the check-data register, the synchronous signals and the at least one piece of liquid crystal shutter control data in the signals thus received being regarded as authentic.

13. The stereographic glasses as set forth in claim 7, wherein in a case where the wireless-signal receiving section performs the radio-wave communication, a reception frequency is variable per cycle or per set of cycles.

* * * * *